United States Patent
Hawwa et al.

(10) Patent No.: US 6,807,030 B1
(45) Date of Patent: Oct. 19, 2004

(54) ENCLOSED PIEZOELECTRIC MICROACTUATORS COUPLED BETWEEN HEAD AND SUSPENSION

(75) Inventors: Muhammad A. Hawwa, Fremont, CA (US); Edmund B. Fanslau, Jr., San Jose, CA (US)

(73) Assignee: Western Digital (Fremont), Inc., Fremont, CA (US)

(*) Notice: Subject to any disclaimer, the term of this patent is extended or adjusted under 35 U.S.C. 154(b) by 0 days.

(21) Appl. No.: 10/024,115

(22) Filed: Dec. 18, 2001

(51) Int. Cl.[7] ............................................. G11B 21/10
(52) U.S. Cl. ......................................................... 360/294.4
(58) Field of Search .......................... 360/294.4, 291.9, 360/292, 294.5, 245.3, 294.3; 369/222; 310/321

(56) References Cited

U.S. PATENT DOCUMENTS

| | | | |
|---|---|---|---|
| 4,188,645 A | 2/1980 | Ragle et al. | 360/75 |
| 4,583,135 A | 4/1986 | Kimura | 360/77 |
| 5,019,931 A * | 5/1991 | Ohwe et al. | 360/245.3 |
| 5,856,896 A | 1/1999 | Berg et al. | 360/104 |
| 5,898,541 A | 4/1999 | Boutaghou et al. | 360/109 |
| 5,912,526 A | 6/1999 | Okawa et al. | 310/328 |
| 6,038,104 A * | 3/2000 | Sato et al. | 360/294.3 |
| 6,046,888 A | 4/2000 | Krinke et al. | 360/104 |
| 6,052,251 A | 4/2000 | Mohajerani et al. | 360/78.05 |
| 6,069,771 A | 5/2000 | Boutaghou et al. | 360/104 |
| 6,108,175 A | 8/2000 | Hawwa et al. | 360/294.4 |
| 6,115,223 A | 9/2000 | Berg et al. | 360/294.4 |
| 6,118,637 A | 9/2000 | Wright et al. | 360/294.4 |
| 6,246,552 B1 | 6/2001 | Soeno et al. | 360/294.4 |
| 6,327,120 B1 * | 12/2001 | Koganezawa et al. | 360/294.4 |
| 6,414,823 B1 * | 7/2002 | Crane et al. | 360/294.5 |
| 6,498,419 B1 * | 12/2002 | Takeuchi et al. | 310/321 |

OTHER PUBLICATIONS

U.S. patent application Ser. No. 09/834,164, Bonin, filed Apr. 12, 2001.
U.S. patent application Ser. No. 09/826,173, Sividasan et al., filed Apr. 4, 2001.

(List continued on next page.)

*Primary Examiner*—Tianjie Chen
(74) *Attorney, Agent, or Firm*—Mark Lauer; Silicon Edge Law Group LLP

(57) ABSTRACT

An actuator is coupled between a head and flexure and gimbal elements, the actuator providing submicron positioning of the head while reducing undesirable vibrations of the flexure and gimbal elements. Such an actuator may have a frame that surrounds a cavity, the frame having an opening disposed adjacent to the head and a wall disposed on an opposite side of the frame from the opening. One or more active elements are disposed in the cavity and attached to the frame, the active element separated from the wall and having a dimension that varies in size in response to a control signal, with a moveable element coupled to the active element and to the head.

24 Claims, 7 Drawing Sheets

OTHER PUBLICATIONS

U.S. patent application Ser. No. 09/811,112, Wu et al., filed Mar. 16, 2001.
U.S. patent application Ser. No. 09/808,843, Crane et al., filed Mar. 15, 2001.
U.S. patent application Ser. No. 09/768,777, Ferrari et al., Jan. 22, 2001.
U.S. patent application Ser. No. 09/034,540, Hawwa et al., filed Mar. 3, 1998.
IEEE Transactions on Magnetics article entitled "Piezoelectric Piggy–Back Microactuator for Hard Disk Drive" by Yoshikazu Soeno et al., vol. 35, No. 2, Mar. 1999, pp. 983–987.
Data Storage Magazine article entitled "Keeping Heads on Track with Dual–Stage Actuators", by Fred Stevens et al., 5 pages, printed Jun. 14, 2001.
Internet article entitled "Keeping Heads of Track With Dual–Stage Actuators", by F. Stevens and J. DeLellis, vol. 7, Issue 6, Jun. 2000, 6 pages, http://ds.pennwellnet.com/content/Artic . . . On_ID=14&Article_ID=75290&Version_Num=2.
Article entitled "Silicon Micromachined Electromagnetic Microactuators For Rigid Disk Drives", by W. Tang et al., 2 pages, date unknown.
Internet article entitled "Surveying Micro–Positioning Technology for Advanced Disk Drives", by B. McInerney, vol. 7, Issue 8, Aug. 2000, 4 pages, http://ds.pennwellnet.com/content/Articl . . . Ion_ID=14&Article_ID=80176&Version_Num=2.
Internet article entitled "IBM High–Bandwidth, High–Accuracy MEMS Micropositioners for Magnetic Disk Drives", printed Jul. 31, 2000, 17 pages.

* cited by examiner

ENCLOSED PIEZOELECTRIC MICROACTUATORS COUPLED BETWEEN HEAD AND SUSPENSION

BACKGROUND

The present invention relates to actuators that may be used to position a transducer relative to a media, for example in an information storage system such as a disk drive.

Conventional disk drives have a rotary actuator that positions a pair of arms or load beams adjacent to each spinning disk of the drive, the arms each holding a smaller flexure and gimbal that are mechanically connected to the head. As a means for increasing the density at which bits are stored and accessed on a media surface, the spacing between adjacent recording tracks and the width of each track may in the future be reduced to a level not accurately accessible with conventional actuators. As a result, a number of designs for dual actuators have been proposed, typically including a conventional rotary actuator and a microactuator disposed nearer to the head for smaller scale positioning.

Although a number of such microactuators have been proposed, room for improvement exists.

SUMMARY

In accordance with the present invention, an actuator is coupled between a head and flexure and gimbal elements, the actuator providing submicron positioning of the head while reducing undesirable vibrations of the flexure and gimbal elements. Such an actuator may have a frame that surrounds a cavity, the frame having an opening disposed adjacent to the head and a wall disposed on an opposite side of the frame from the opening. One or more active elements are disposed in the cavity and attached to the frame, the active element separated from the wall and having a dimension that varies in size in response to a control signal, with a moveable element coupled to the active element and to the head.

DETAILED DESCRIPTION OF THE PREFERRED EMBODIMENTS

Figure 1:
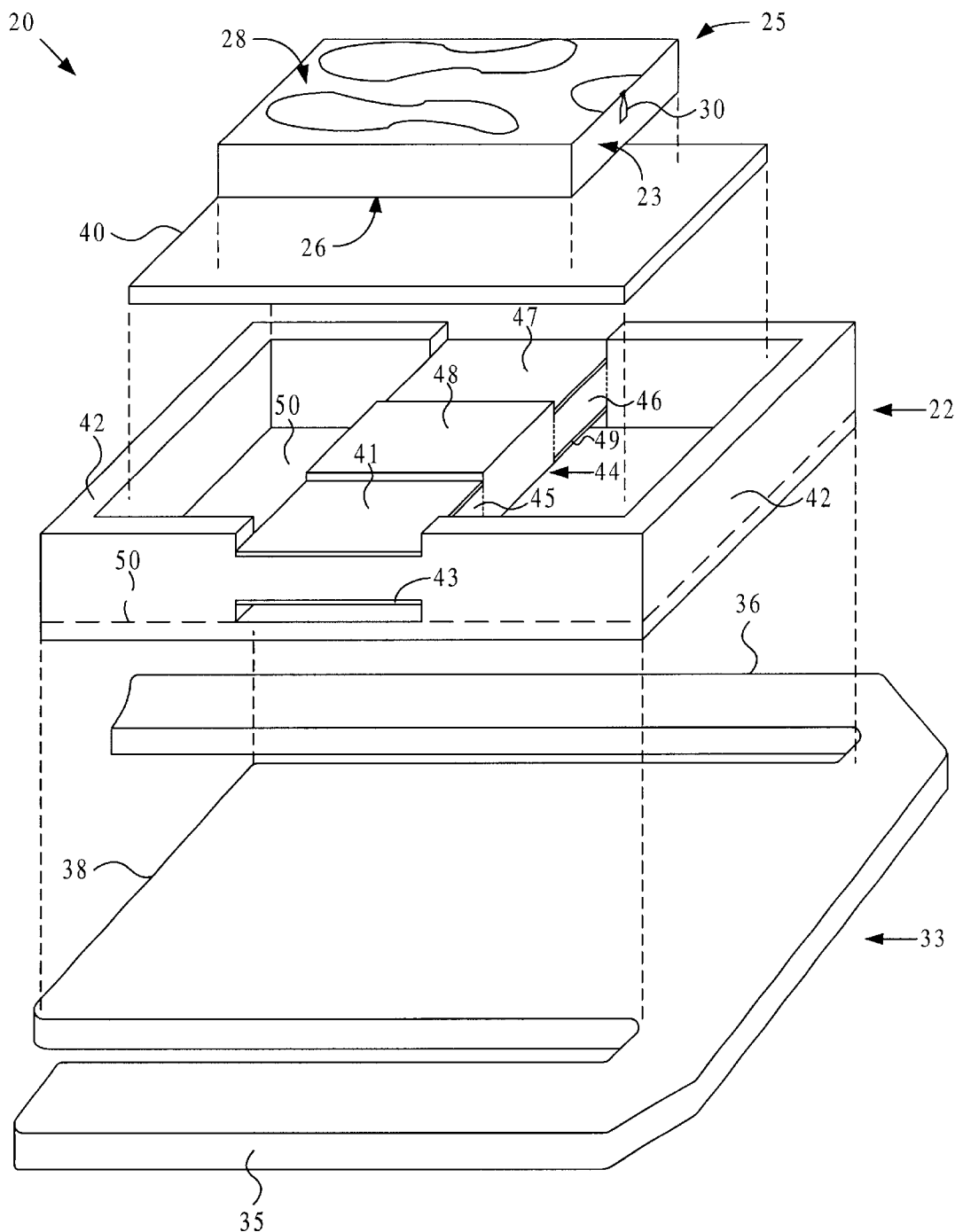
FIG. 1 is an exploded perspective view of a first embodiment of an actuator in accordance with the present invention, along with a head and flexure coupled to the actuator.

FIG. 1 is an exploded perspective view of a first embodiment of an apparatus 20 for reading or writing information on a media, the media not shown in this figure. The apparatus 20 includes an actuator 22 that is coupled between a head 25 and a flexure 33.

The head 25 has a media-facing surface 28 and an electromagnetic transducer 30 disposed at a trailing end 23 of the head adjacent to the media-facing surface. The transducer 30 may include magnetoresistive (MR), inductive, electro-optical or other mechanisms that covert one form of electromagnetic energy to another, as well as combinations of such mechanisms or transducers. A back surface 26 of the head 25 faces a substantially opposite direction compared to the media-facing surface 28.

The flexure 33 includes a pair of flexible arms 35 and 36 and a tongue 38. The flexible arms 35 and 36 are connected to a stiffer positioning member such as a load beam, not shown in this figure. A protrusion from the load beam, not shown, may be disposed in contact with a back side of the tongue 38 to act as a fulcrum that, in combination with the flexure, forms a gimbal mechanism.

The actuator 22 is disposed adjacent to the head 25, and may be attached to the back surface 26 of the head with an optional plate 40. The actuator 22 includes a frame 42 surrounding a cavity with an opening disposed adjacent to the head 25. A single deformable beam 44 is disposed within the cavity and attached at both ends to the frame 42. The deformable element or beam 44 in this embodiment includes active regions 45 and 46 and an inactive region 48 that is movable relative to the frame 42. The moveable inactive region 48 is coupled to the head 25, either directly or via the plate 40, so that the head 25 is movable relative to the frame 42.

The active regions 45 and 46 can expand or contract according to a piezoelectric effect or other known mechanisms in response to a signal such as an electric field, thereby positioning the head 25. A pair of conductive layers 41 and 43 have been formed on active region 45, and another pair of conductive layers 47 and 49 have been formed on active region 46. Application of an electric field by conductive layers 41 and 43 across active region 45 can cause that region to expand or contract along a direction of the length of beam 44, while application of an electric field by conductive layers 47 and 49 across active region 46 can cause that region to expand or contract along a direction of the length of beam 44. When one of the active regions 45 or 46 contracts in the lengthwise direction of the beam, and the other of the active regions 45 or 46 expands in the lengthwise direction, the moveable region 48 is shifted relative to the frame 42 in the lengthwise direction.

The actuator 22 includes a wall 50 disposed on an opposite side of the frame 42 from the head 25, and the beam 44 is spaced apart from the wall 50. The wall 50 may be considered a part of the frame or a separate element, depending partially on the material forming the wall. The wall 50 is attached to the tongue 38 of the flexure 33, so that lateral positioning of the flexure by a conventional rotary actuator, not shown, translates into lateral positioning of the head 25. The wall 50 may be attached to the tongue 38 by a damping material, however, so that vibrations from movements of the actuator 22 are absorbed, reducing disturbances of the flexure 33 caused by the actuator 22. Alternatively, the wall 50 can be made of a material that absorbs vibrations, such as polyamide. Even without damping material, the separation of the wall 50 from the active regions 45 and 46 reduces mechanical noise and removes friction that would otherwise be transferred from those elements to the flexure 33, reducing deleterious vibration modes that would otherwise be created in the flexure by the actuator 22.

In operation, the optional plate 40 or cap fits within the frame 42 opening, providing limited relative movement of the plate 40 compared to the frame. The cap 40 blocks contaminants from entering the cavity that might otherwise degrade the performance of the actuator 22. The cap 40 may be spaced a few microns from the frame 42 on the sides of the frame to which the beam 44 is attached, allowing the head 25 to be moved laterally those few microns from a central position by the actuator 22, while serving as a motion limitation device that protects the head in the event of a mechanical shock. The cap 40 also provides a relatively large surface for attachment to the head 25. In another embodiment, the head 25 may be attached directly to the moveable element 48 and fit within the opening of the frame, reducing the mass that is attached distal to the plane of the flexure 33. Reducing the mass that is attached out of the plane of the flexure 33 reduces the change in angular momentum as the head 25 accelerates and decelerates during seek and settle operations between various media tracks, thus reducing vibrations induced in the flexure and improving access time.

Figure 2:
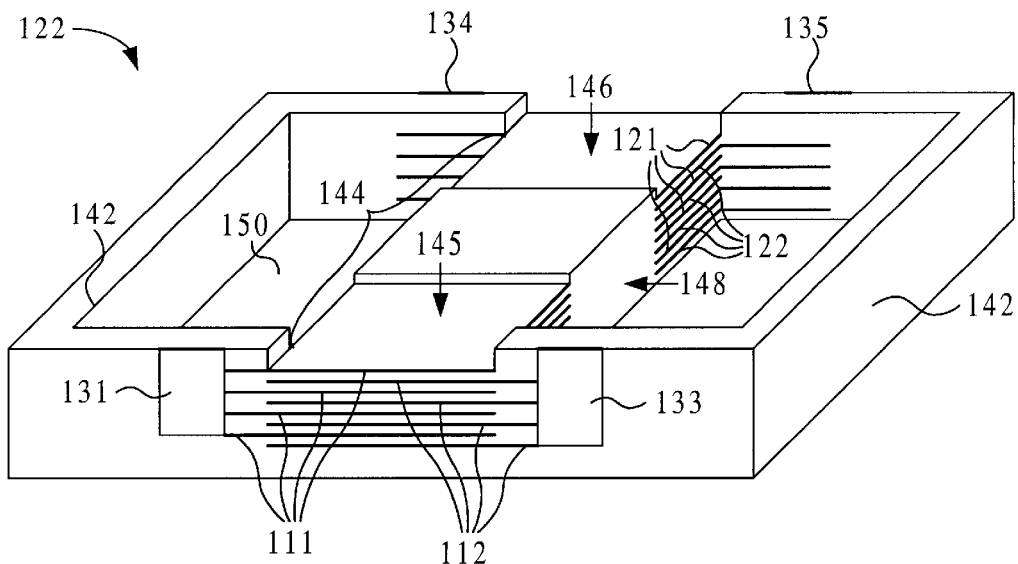
FIG. 2 is a perspective view of a second embodiment of an actuator that has a deformable beam that is spaced apart from a wall of a frame, the beam including two stacks of alternating piezoelectric and electrically conductive layers.

FIG. 2 shows another actuator 122 that has a deformable beam 144 that is spaced apart from a wall 150 of a frame 142. Deformable beam 144 includes active elements 145 and 146, each of whish has a stack of alternating piezoelectric and electrically conductive layers, and an inactive area 148 disposed between the active areas 145 and 146. Conductive layers 111 and 112 are alternately spaced through active region 145, with a piezoelectric layer disposed between each pair of adjacent layers 111 and 112. Conductive layers 111 and 112 are connected to conductive regions 131 and 133, respectively, so that each of the layers 111 has a voltage equal to that of region 131, and each of the layers 112 has a voltage equal to that of region 133. Similarly, conductive layers 121 and 122 are alternately spaced through active region 146, with a piezoelectric layer disposed between each pair of adjacent layers 121 and 122. Conductive layers 121 and 122 are connected to conductive regions 134 and 135, respectively, so that each of the layers 121 has a voltage equal to that of region 134, and each of the layers 122 has a voltage equal to that of region 135.

The piezoelectric layers disposed in region 145 have been polled to expand along the length of beam 144 when the voltage of layers 111 is greater than that of layer 112, and to contract along the length of beam 144 when the voltage of layers 111 is less than that of layer 112, or vice-versa. Thus, applying different voltages to region 131 and to region 133 causes active region 145 to expand or contract toward or away from inactive region 148. Similarly, the piezoelectric layers disposed in region 146 have been polled to expand along the length of beam 144 when the voltage of layers 121 is greater than that of layer 122, and to contract along the length of beam 144 when the voltage of layers 121 is less than that of layer 122, or vice-versa. Thus, applying different voltages to region 134 and to region 135 causes active region 145 to expand or contract toward or away from inactive region 148. By applying appropriate voltages to regions 131, 133, 134 and 135, region 145 can be made to expand and region 146 contract, or vice-versa, causing region 148 to shift relative to frame 142.

Stacking the piezoelectric materials in this fashion results in a larger electric field, for a given voltage difference, between closely spaced conductive layers such as layers 111 and 112 than the field between layers that are spaced further apart, such as layers 41 and 43 of FIG. 1. The greater electric field in turn can result in a greater deformation of active regions such as regions 145 and 146 in response to an applied voltage.

Figure 3:
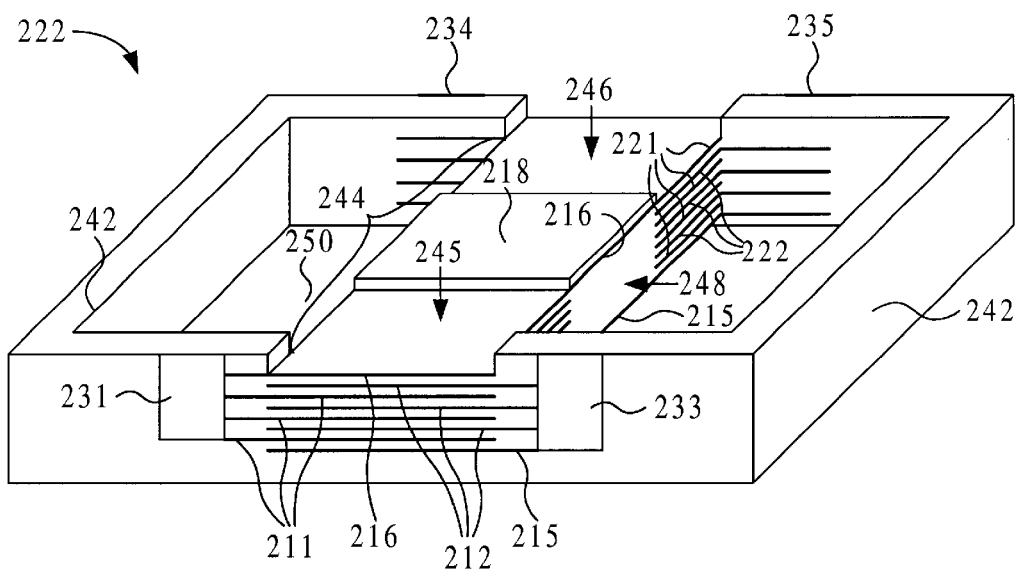
FIG. 3 is a perspective view of a third embodiment of an actuator that has a deformable beam that is spaced apart from a wall of a frame, the beam including two stacks of alternating piezoelectric and electrically conductive layers.

FIG. 3 shows a similar actuator 222 that has a deformable beam 244 that is spaced apart from a wall 250 of a frame 242. Deformable beam 244 also includes active elements 245 and 246 that each have a stack of alternating piezoelectric and electrically conductive layers, and an inactive area 248 disposed between the active areas 245 and 246. Conductive layers 211 and 212 are alternately spaced through active region 245, with a piezoelectric layer disposed between each pair of adjacent layers 211 and 212. Conductive layers 211 and 212 are connected to conductive regions 231 and 233, respectively, so that each of the layers 211 has a voltage equal to that of region 231, and each of the layers 212 has a voltage equal to that of region 233. Similarly, conductive layers 221 and 222 are alternately spaced through active region 246, with a piezoelectric layer disposed between each pair of adjacent layers 221 and 222. Conductive layers 221 and 222 are connected to conductive regions 234 and 235, respectively, so that each of the layers 221 has a voltage equal to that of region 234, and each of the layers 222 has a voltage equal to that of region 235.

Note that conductive layer 215 is connected to conductive region 235 as well as to conductive region 233. Because of this, layers 211, 215 and 222 are all at the same potential as regions 233 and 235, so applying a voltage to either region 233 or 235 controls half of the conductive layers in each of the active regions 245 and 246. Similarly, conductive layer 216 is connected to conductive region 234 as well as to conductive region 231. Therefore, layers 212, 216 and 221 are all at the same potential as regions 231 and 234, so applying a voltage to either region 231 or 234 controls the other half of the conductive layers in each of the active regions 245 and 246. Because only two electrical connections are needed to operate actuator 222, providing electrical leads and connections to the actuator is simplified.

Figure 4:
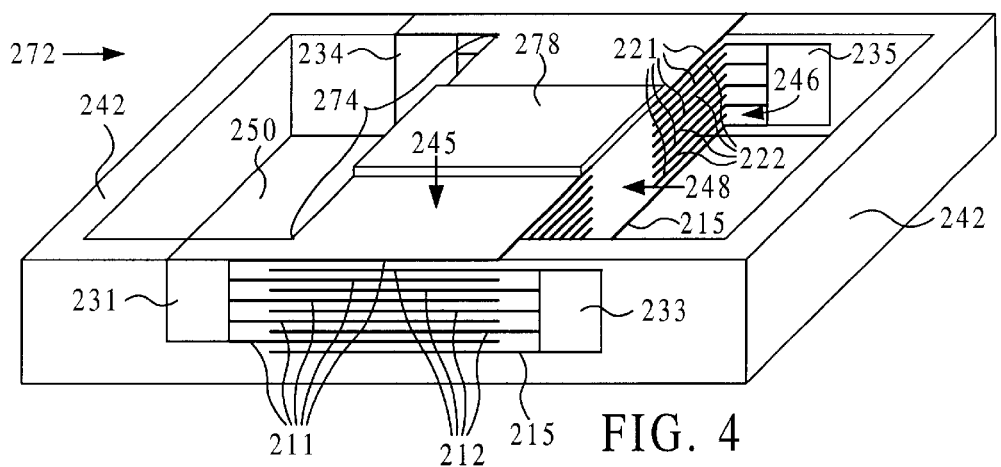
FIG. 4 is a perspective view of a fourth embodiment of an actuator that has a deformable beam that is spaced apart from a wall of a frame, the beam including two stacks of alternating piezoelectric and electrically conductive layers.

FIG. 4 shows an actuator 272 similar to that shown in FIG. 3, and so like parts are numbered the same. In the embodiment shown in FIG. 4, however, deformable beam 272 is removed from the wall 250 but is flush with a top of the frame 242, with a plate 278 that projects above the frame 242. This allows the beam 272 to contain additional piezoelectric and conductive layers. Also note that while common conductive layer 215 electrically connects layers 212 and 221, such a common layer does not exist between layers 211 and 222. Instead, plate 278 is electrically conductive and connects layers 211 and 222.

Figure 5:
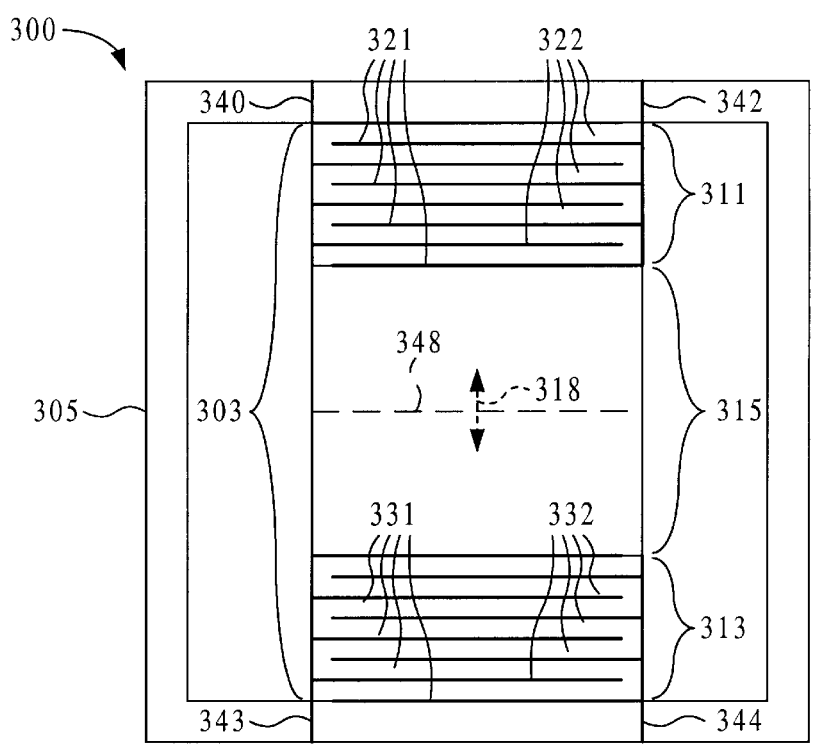
FIG. 5 is a top view of a fifth embodiment of an actuator that has a deformable beam including two stacks of alternating piezoelectric and electrically conductive layers.

FIG. 5 is a top view of another actuator 300. Like the previously described embodiments, the actuator 300 has a deformable beam 303 that-is attached to a frame 305 that surrounds the beam. Deformable beam 303 includes active elements 311 and 313 that each have a stack of alternating piezoelectric and electrically conductive layers, and an inactive moveable element 315 disposed between the active elements 311 and 313. Conductive layers 321 and 322 are alternately spaced through active region 311, with a piezoelectric layer disposed between each pair of adjacent layers 321 and 322. The motion of moveable element 315 in response to actuation of active elements 311 and 313 is illustrated with arrow 318.

Figure 6:
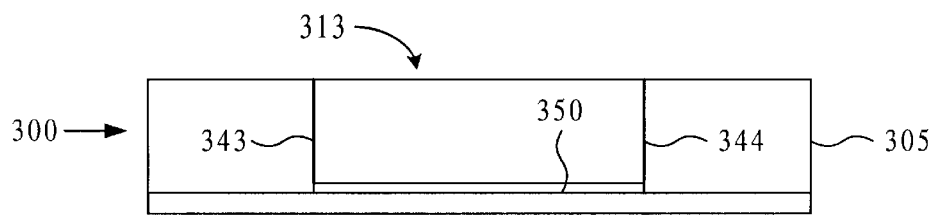
FIG. 6 is a side view of the actuator of FIG. 5, showing that the beam is spaced apart from a wall of a frame.

Conductive layers 321 and 322 are connected to conductive regions 342 and 340, respectively, so that each of the layers 321 has a voltage equal to that of region 342, and each of the layers 322 has a voltage equal to that of region 340. Conductive regions 342 and 340 extend thorough frame 305 to provide electrical connections to the active element 311. Similarly, conductive layers 331 and 332 are alternately spaced through active region 313, with a piezoelectric layer disposed between each pair of adjacent layers 331 and 332. Conductive layers 331 and 332 are connected to conductive regions 343 and 344, respectively, so that each of the layers 331 has a voltage equal to that of region 344, and each of the layers 332 has a voltage equal to that of region 343. As shown in FIG. 6, a wall 350 that is attached to the frame 305, but separated from deformable beam 303.

Deformable beam 303 may be formed by combining two separate parts along bond interface 348, with the beam 303 then poled and sliced or otherwise formed into rows. The rows are masked along a central area covering moveable element 315 and ends that will form an outer surface of frame 305 are also covered while the rows are dipped in a conductive material to form conductive regions 340, 342, 343 and 344. The rows are then diced into die including beam 303, which is then attached to frame 305 by epoxy, for example, at end portions of conductive regions 340, 342, 343 and 344. Alternatively, beam 303 may be formed by layering piezoelectric materials such as PZT and deposited conductive patterns on both sides of a substrate, with the PZT layers then poled and sliced or otherwise formed into rows, which are coated as described above to form conductive regions 340, 342, 343 and 344, diced into single beams and attached to frame 305. As shown in FIG. 6, conductive regions 343 and 344 extend through frame 305 to provide electrical connections to the active element 313.

Figure 7:
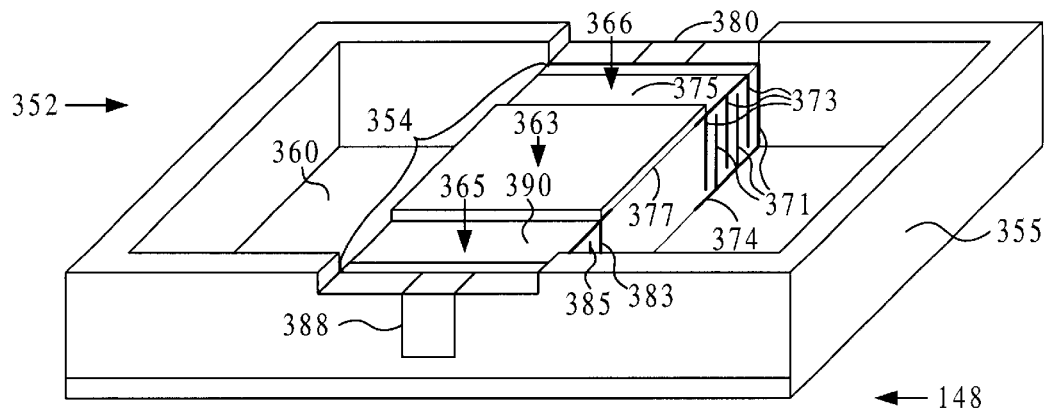
FIG. 7 is a perspective view of a sixth embodiment of an actuator that has a deformable beam that is spaced apart from a wall of a frame, the beam including two stacks of alternating piezoelectric and electrically conductive layers.

FIG. 7 shows an actuator 352 that, like the embodiment shown in FIG. 5 and FIG. 6, has piezoelectric layers that expand and contract in a direction substantially aligned with electric field lines between adjacent electrodes. Similar to all other embodiments previously described, actuator 352 has a single deformable beam 354 that is attached to a frame 355, with a wall 360 attached to frame 355 but spaced apart from beam 354. The beam 354 includes a moveable element 363 sandwiched between two active elements 365 and 366.

A bottom conductive region 374 adjoins active element 366 adjacent to wall 350 and a top conductive region 375 adjoins the active element distal to wall 350. Top conductive region 375 does not contact frame 355 but is connected to a conductive cap 377. A set of alternate conductive layers 371 extend to connect with the bottom conductive region 374, while the other interspersed conductive layers 373 extend to connect with the top conductive region 375. An end layer of conductive layers 371 extends to connect with a conductive region 380 of the frame 355. Between the overlapping conductive layers 371 and 373 are layers of piezoelectric material such as PZT that have been polled to expand or contract in unison upon application of different voltages to conductive layers 371 and 373.

Active element 365 is similar to active element 366 but more difficult to see in this perspective view. An end layer of a set of conductive layers 385 is connected to a bottom conductive region of element 365 and extends to connect with a conductive region 388 of the frame 355. Alternate conductive layers 383 of active element 365 connect with a top conductive region 390 that is connected with cap 377. Cap 377 may be connected to a slider directly or with another conductive cap, and connected to ground voltage, whereas conductive regions 380 and 388 are connected to a voltage that can swing between positive and negative to control the position of the slider. Beam 354 may be formed by layering piezoelectric materials such as PZT and deposited conductive patterns on both sides of a PZT substrate, with the PZT layers then poled and sliced or otherwise formed into rows, which are coated as described above to form conductive regions 374, 375 and 390. The rows are then diced into single beams and attached to frame 355 by conductive epoxy.

Figure 8:
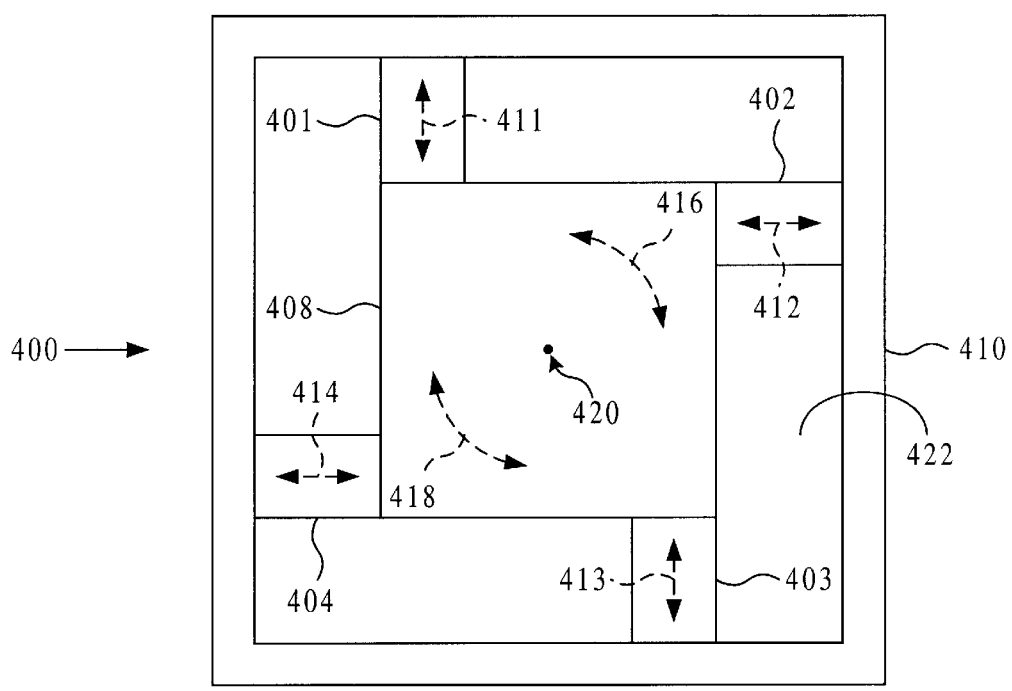
FIG. 8 is a top view of a seventh embodiment of an actuator having a plurality of active elements that produce rotary motion of a moveable element.

FIG. 8 is a top view of another actuator 400, in which a plurality of active elements 401, 402, 403 and 404 are coupled between a moveable element 408 and a stationary element 410. Active elements 401, 402, 403 and 414 can expand or contract as shown by arrows 411, 412, 413 and 414, producing a rotational motion in moveable element or rotor 408 compared to a stationary element or stator 410, as shown by arrows 416 and 418. Depending upon the distance between the attached transducer, not shown in this figure, and an axis of rotation 420 of the rotor 408, the linear movement of the transducer can be magnified or reduced compared to the linear movement of each active element 401, 402, 403 and 404. Moveable element 408 thus can serve as a lever arm for the active elements 401, 402, 403 and 414. Related disclosure of other rotary actuator devices can be found in the application of inventors Yimin Niu, Edmund B. Fanslau, Jr. and Muhammad A. Hawwa, entitled "Piezoelectric Microactuators with Substantially Fixed Axis of Rotation and Magnified Stroke," filed on even date herewith and incorporated by reference herein.

Figure 9:
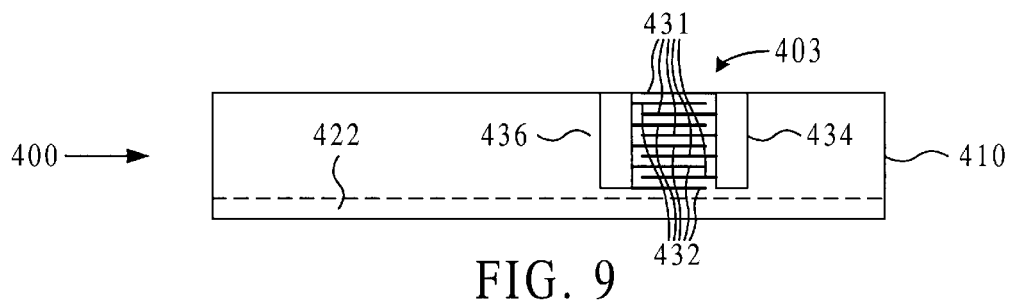
FIG. 9 is a side view of the actuator of FIG. 8, showing electrical connections and a space between an active element and a wall of a frame.

As more easily seen in FIG. 9, which is a side view of actuator 400, a wall 422 is attached to the frame or stator 410 but removed from the active elements such as active element 403. The wall 422 is in operation attached to a suspension member such as a tongue, and the wall 422 may include or be attached to the suspension member with a damping material to reduce the transfer of vibrations between the active elements and the suspension. The relatively large surface area of the wall 422 is helpful in this regard, as is the isolation of the active elements 401, 402, 403 and 404 from the wall 422.

Active element 403 includes a stack of alternating piezoelectric and electrically conductive layers. That is, conductive layers 431 and 432 are alternately spaced through active element 403, with a piezoelectric layer disposed between each pair of adjacent layers 431 and 432. Conductive layers 431 and 432 are connected to conductive regions 434 and 436, respectively, so that each of the layers 431 has a voltage equal to that of region 434, and each of the layers 432 has a voltage equal to that of region 436. As mentioned above with regard to other embodiments, a cap can be attached to moveable element 408, with a back side of a slider attached to the cap, or the slider can be directly attached to the moveable element 408.

Figure 10:
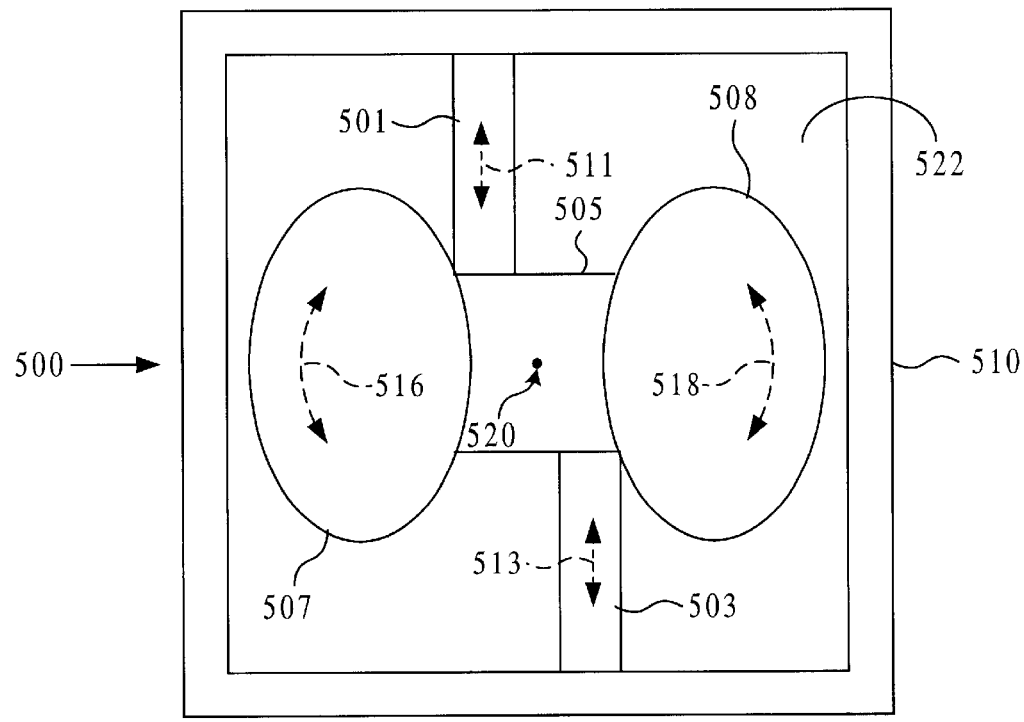
FIG. 10 is a top view of an eighth embodiment of an actuator having a plurality of active elements that produce rotary motion of a moveable element.

FIG. 10 is a top view of another actuator 500, in which a plurality of active elements 501 and 503 are coupled between a moveable element 505 and a stationary element 510. Caps 507 and 508 are attached to moveable element 505. Active elements 501 and 503 can expand or contract as shown by arrows 511 and 513, producing a rotational motion in moveable element 505 and caps 507 and 508 compared to a stationary element or stator 410, as shown by arrows 516 and 518. Depending upon the distance between the attached transducer, not shown in this figure, and an axis of rotation 520 of the moveable element or rotor 505, the linear movement of the transducer can be magnified or reduced compared to the linear movement of each active element 501 and 503. Caps 507 and 508 thus can serve as a lever arm for the active elements 501 and 503.

Figure 11:
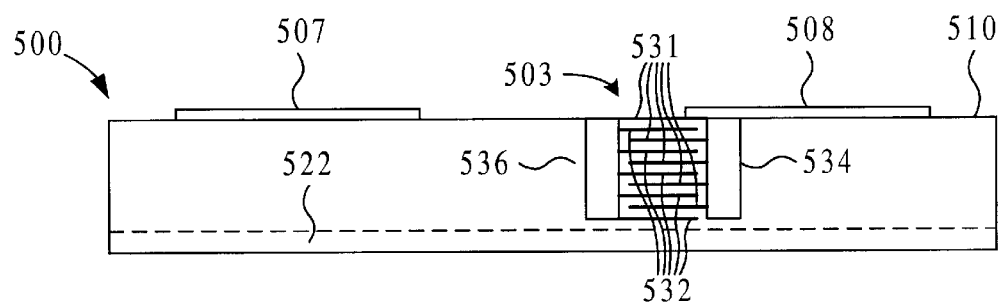
FIG. 11 is a side view of the actuator of FIG. 10, showing electrical connections and a space between an active element and a wall of a frame.

As more easily seen in FIG. 11, which is a side view of actuator 500, a wall 522 is attached to the frame or stator 510 but removed from the active elements such as active element 503. The wall 522 is in operation attached to a suspension member such as a tongue, not shown in this figure, and the wall 522 may include or be attached to the suspension member with a damping material to reduce the transfer of vibrations between the active elements and the suspension. The relatively large surface area of the wall 522 is helpful in this regard, as is the isolation of the active elements 501 and 503 from the wall 522.

Active element 503 includes a stack of alternating piezoelectric and electrically conductive layers. That is, conductive layers 531 and 532 are alternately spaced through active element 503, with a piezoelectric layer disposed between each pair of adjacent layers 531 and 532. Conductive layers 531 and 532 are connected to conductive regions 534 and 536, respectively, so that each of the layers 531 has a voltage equal to that of region 534, and each of the layers 532 has a voltage equal to that of region 536. Caps 507 and 508 extend above the frame 510 to attach with a back side of a slider, not shown in this figure, or the slider can be directly attached to the moveable element 505.

The actuators shown in FIG. 1 through FIG. 11 can be made by assembling and connecting discrete parts, each of which has been selected for favorable performance of its specific task. For example, frame 42, cap 40 and moveable element 48 of actuator 22 shown in FIG. 1 can be made of ceramic, molded plastic or other nonconductive materials, while active regions 45 and 46 can be made of PZT or other piezoelectric materials that have been polled to change their dimensions as desired upon application of an electric field at conductors 41, 43, 47 and 49.

Figure 12:
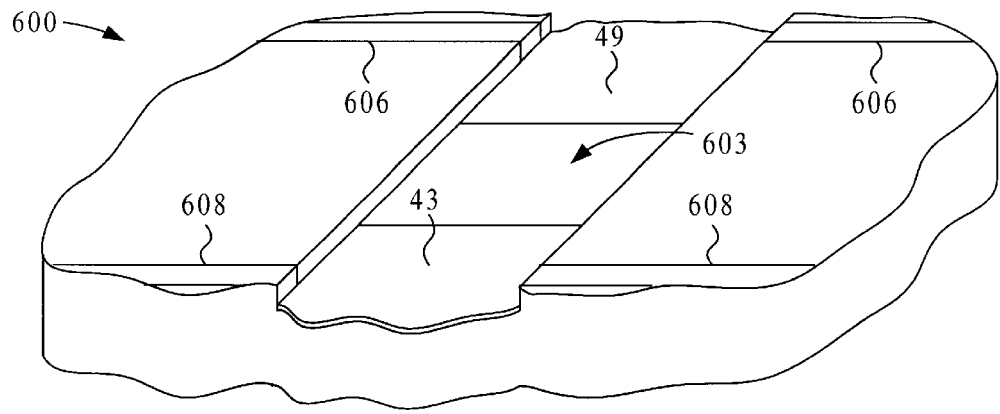
FIG. 12 is a perspective view of an initial phase in the formation of the actuator of FIG. 1 from a wafer of piezoelectric material.

Alternatively, as shown beginning with FIG. 12, actuator 22 can be made by bulk micromachining a wafer of piezoelectric material such as PZT. In FIG. 12, a part 600 of such a wafer is illustrated that focuses on creation of a single actuator, while many other actuators may be simultaneously created from the same wafer. The wafer has been etched for example with ion beam etching (IBE), reactive ion etching (RIE), laser scribing or sand blasting to create a first recessed area 603 that will become the spacing between the beam 44 and wall 50 shown in FIG. 1. Electrically conductive material has been deposited in areas 43 and 49, which will be used to control the expansion and contraction of active regions 45 and 46, respectively. Additional electrically conductive strips 606 and 608 have been deposited to provide temporary electrical connections to leads 43 and 49, and to similar leads in a pair of adjacent actuator rows on the wafer.

Figure 13:
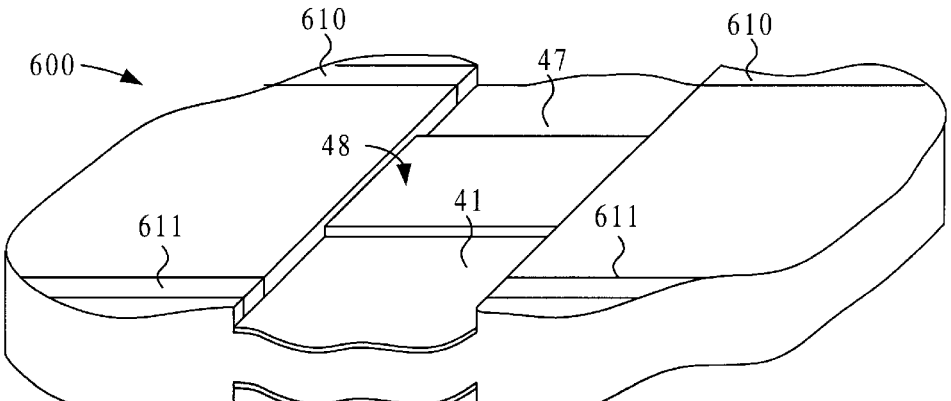
FIG. 13 is a perspective view of a phase in the formation of the actuator of FIG. 1 subsequent to the phase of FIG. 12.

FIG. 13 focuses on the same part 600 of the wafer after the wafer has been inverted to work an opposite surface. A second recessed area has been created, for example with IBE, RIE, laser scribing or sand blasting while other portions of the wafer were masked, the second recessed area forming a surface of inactive area 48. Third and fourth recessed areas have been similarly created and then coated with a conductive material to form conductive layers 41 and 47. Additional electrically conductive strips 610 and 611 have been deposited to provide temporary electrical connections to leads 43 and 49 and to similar leads in a pair of adjacent actuator rows of the wafer.

After the creation of opposing electrodes 41 and 43 and opposing electrodes 47 and 49, the active regions 45 and 46 can be created by supplying voltage to the conductive layers 41, 43, 47 and 49 via strips 606, 608, 610 and 611 while annealing the wafer at a high temperature (700° C. to 1100° C.).

Figure 14:
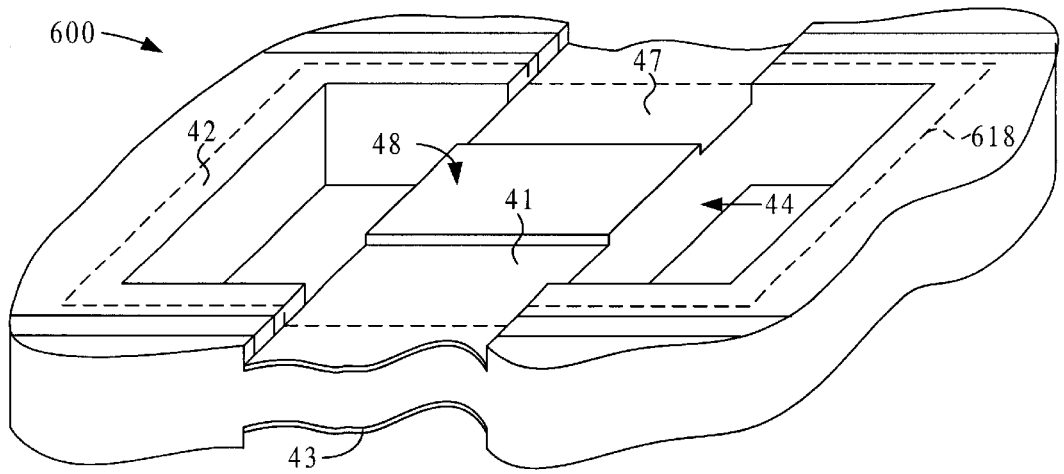
FIG. 14 is a perspective view of a phase in the formation of the actuator of FIG. 1 subsequent to the phase of FIG. 13.

FIG. 14 shows the wafer part 600 after highly directional etching such as IBE, RIE, laser scribing or sand blasting has been performed that cuts through the wafer to define beam 44. An edge 618 of frame 42 can be defined by sawing. Alternatively, edge 618 can be defined by the same etching procedure that defines beam 44.

Figure 15:
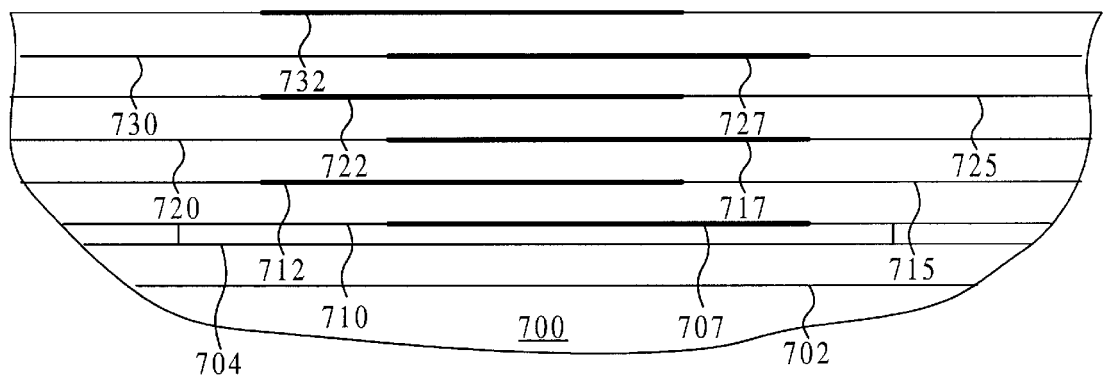
FIG. 15 is a cross-sectional view of an initial phase in the formation of the actuator of FIG. 2, FIG. 3 or FIG. 4 from plural layers of piezoelectric material and patterned conductive layers.

FIG. 15 is a cross-sectional view of an initial stage in the creation of an actuator having a stack of alternating conductive and piezoelectric materials, such as shown in FIG. 2, FIG. 3 and FIG. 4. Although not shown, thousands of additional actuators may be formed simultaneously during the same fabrication steps. On a substrate 700, a first layer 702 of PZT or other ceramic material has been formed, by deposition or by laying out a layer of PZT tape. A release layer 704 has been formed, for example of silicon dioxide, that will later be removed by chemical etching. Alternatively, the wafer 700 may be formed of PZT so that first layer 702 is not necessary.

A first layer 707 of electrically conductive material is deposited on the release layer 704 in a pattern defined by photolithography that includes a strip similar to strip 608 of FIG. 14, not shown in FIG. 15, the strip connected to other actuators being formed in the same row to provide a temporary electrical connection to all the actuators in that row. A piezoelectric layer 710 of PZT or other material is then formed on the release layer 704 and first electrically conductive layer 707. A second layer 712 of electrically conductive material is deposited on the piezoelectric layer 710 in a pattern defined by photolithography that includes another strip connected to other actuators being formed in the same row to provide a temporary electrical connection to all the actuators in that row. The strip 707 connected to layer 707 and the strip connected to layer 712 preferably do not overlap in areas that will be part of a finished actuator, so for example one strip may be disposed in a space between actuator rows and the other strip may be disposed in the area of the inactive moveable element of each actuator in a row. Alternatively, both strips may be disposed in the space between actuator rows that is later removed.

Additional piezoelectric layers 715, 720, 725, and 730 are similarly formed, along with additional electrically conductive layers 717, 722, 727 and 732. Each of the even-numbered conductive layers has substantially the same pattern, and each of the odd-numbered conductive layers has substantially the same pattern. The wafer and adjoining layers are then annealed at a high temperature (700° C. to 1100° C.) while a first voltage is provided to even-numbered conductive layers and a different second voltage is provided to odd-numbered conductive layers. The piezoelectric layer areas in which adjacent even-numbered conductive layers overlap odd-numbered conductive layers, such as an overlapping portion of layers 707 and 712, are polled by this process so that, upon cooling, those areas respond by expanding or contracting when differing voltages are again applied to the different conductors.

Recessed areas and apertures are then created as desired to form the actuators described above, for example with IBE, RIE, laser scribing or sand blasting, with conductive material such as silver or gold paste then applied as needed to provide electrical access to outside the actuator frames.

Although we have focused on teaching the preferred embodiments of an improved microactuator, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

What is claimed is:

1. An apparatus for reading or writing information on a media, the apparatus comprising:
   a head having a media-facing surface and a non-media-facing surface, said head including an electromagnetic transducer; and
   an actuator disposed adjacent to said non-media-facing surface, said actuator including:
      a frame surrounding a cavity, said frame having an opening disposed adjacent to said head and a wall disposed on an opposite side of said frame from said opening,
      at least one deformable element disposed in said cavity and attached to said frame, said deformable element separated from said wall and having a shape that varies in response to a control signal, and
      a moveable element coupled to said deformable element and to said head.

2. The apparatus of claim 1, further comprising:
   a cap attached to said moveable element and disposed in said opening.

3. The apparatus of claim 1, wherein:
   said wall contains a damping material.

4. The apparatus of claim 1, further comprising:
   a flexible element attached to said wall to position said frame, wherein said deformable element is separated from said flexible element by said wall.

5. The apparatus of claim 4, further comprising:
   a flexible element attached to said wall to position said frame, and a damping material disposed between said frame and said flexible element, wherein said deformable element is separated from said flexible element by said damping material.

6. The apparatus of claim 1, further comprising:
   a second deformable element disposed in said cavity and coupled to said moveable element.

7. The apparatus of claim 6, wherein:
   a direction of motion of said one deformable element and a direction of motion of said second deformable element are substantially aligned with a point to produce substantially linear motion of said head in response to said signal.

8. The apparatus of claim 6, wherein:
   a direction of motion of said one deformable element and a direction of motion of said second deformable element are aligned away from an axis, thereby producing rotational motion of said head about said axis in response to said signal.

9. The apparatus of claim 1, wherein:
   said moveable element includes at least one lever arm coupled between said head and said deformable element to amplify a movement of said head compared to that of said deformable element.

10. The apparatus of claim 1, wherein:
    said frame, said deformable element and said moveable element contain a piezoelectric material.

11. The apparatus of claim 1, further comprising:
    an electrically conductive cap attached to said moveable element.

12. The apparatus of claim 1, wherein:
    said deformable element contains at least three electrode layers interspersed with a piezoelectric material.

13. An apparatus for reading or writing information on a media, the apparatus comprising:
    a head having a media-facing surface and a non-media-facing surface, said head including an electromagnetic transducer;
    a flexible element coupled to said head to position said transducer; and
    an actuator disposed adjacent to said non-media-facing surface, said actuator including:
       a frame surrounding a cavity, said frame having an opening disposed adjacent to said head and a wall disposed on an opposite side of said frame from said opening, said wall attached to said flexible element,
       a plurality of active elements disposed in said cavity and attached to said frame, said active elements separated from said wall and having dimensions that vary in size in response to a control signal, wherein the active elements are separated from said flexible element by said wall, and
       a moveable element coupled to said active elements and to said head.

14. The apparatus of claim 13, further comprising:
    a cap attached to said moveable element and disposed in said opening.

15. The apparatus of claim 14, wherein:
    said cap contains an electrically conductive material.

16. The apparatus of claim 14, wherein:
    said wall contains a damping material.

17. The apparatus of claim 13, wherein:
    said wall is attached to said flexible element with a damping material.

18. The apparatus of claim 13, wherein:
    a direction of motion of a first of said active elements and a direction of motion of a second of said active elements are substantially aligned with a point to produce substantially linear motion of said head in response to said signal.

19. The apparatus of claim 13, wherein:
    a direction of motion of a first of said active elements and a direction of motion of a second of said active elements are aligned away from an axis, thereby producing rotational motion of said head about said axis in response to said signal.

20. The apparatus of claim 13, wherein:
said moveable element includes at least one lever element coupled between said head and said active element to amplify a movement of said head compared to that of said active element.

21. The apparatus of claim 13, wherein:
said frame, said active element and said moveable element contain a piezoelectric material.

22. The apparatus of claim 13, wherein:
said moveable element is coupled to aid head with a plurality of caps.

23. The apparatus of claim 13, wherein:
said active elements each contain at least three electrode layers interspersed with a piezoelectric material.

24. An apparatus for reading or writing information on a media, the apparatus comprising:
- a head having a media-facing surface and a non-media-facing surface, said head including an electromagnetic transducer;
- a flexible element coupled to said head to position said transducer; and
- an actuator disposed adjacent to said non-media-facing surface, said actuator including:
  - a frame surrounding a cavity, said frame having an opening disposed adjacent to said head and a wall disposed on an opposite side of said frame from said opening, said wall attached to said flexible element,
  - a plurality of active elements disposed in said cavity and attached to said frame, said active elements separated from said wall and having dimensions that vary in size in response to a control signal, said active elements each containing at least three electrode layers interspersed with a piezoelectric material, with each of said electrode layers extending in a direction substantially perpendicular to said wall, and
  - a moveable element coupled to said active elements and to said head.

* * * * *